Patented Jan. 24, 1950

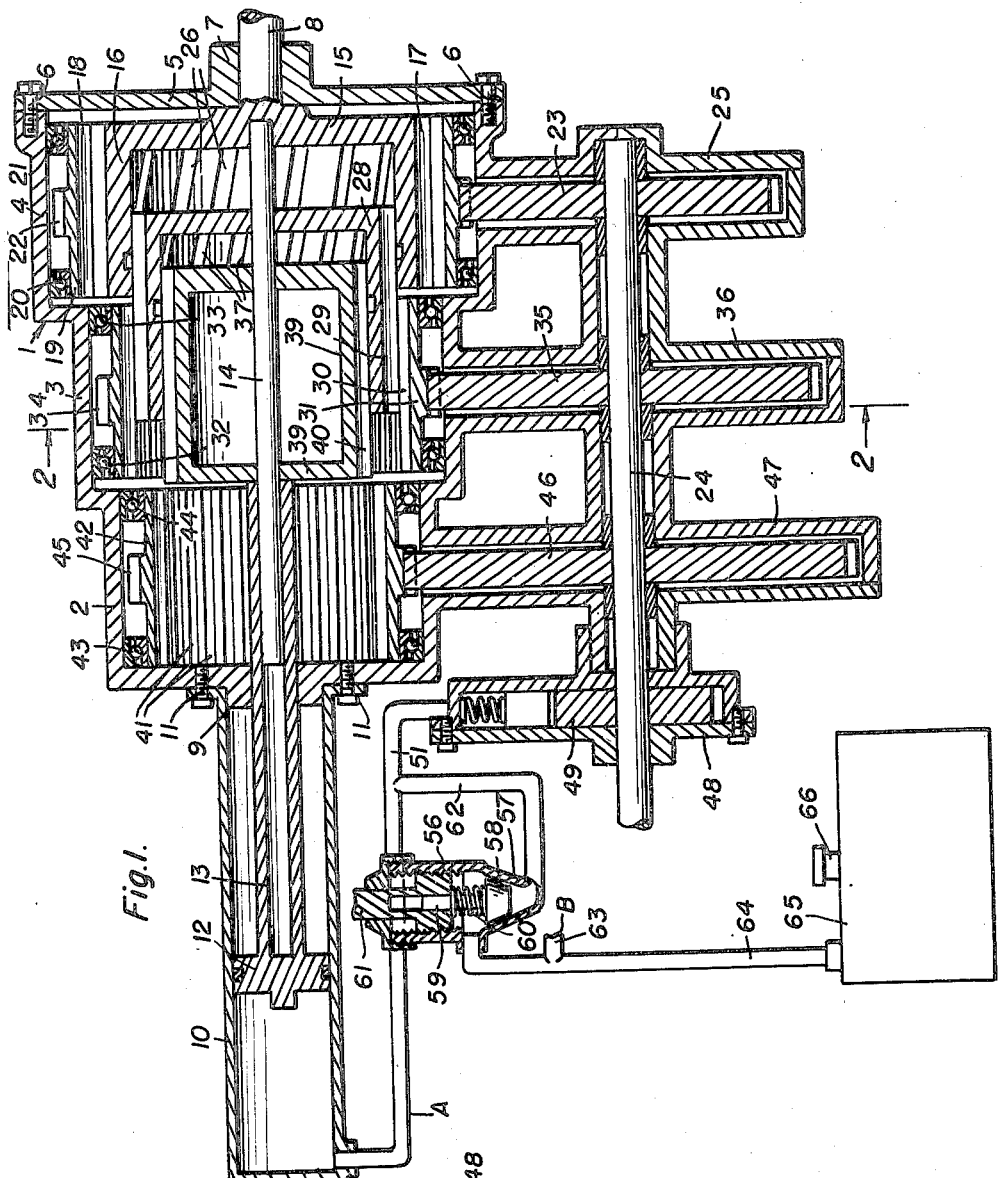

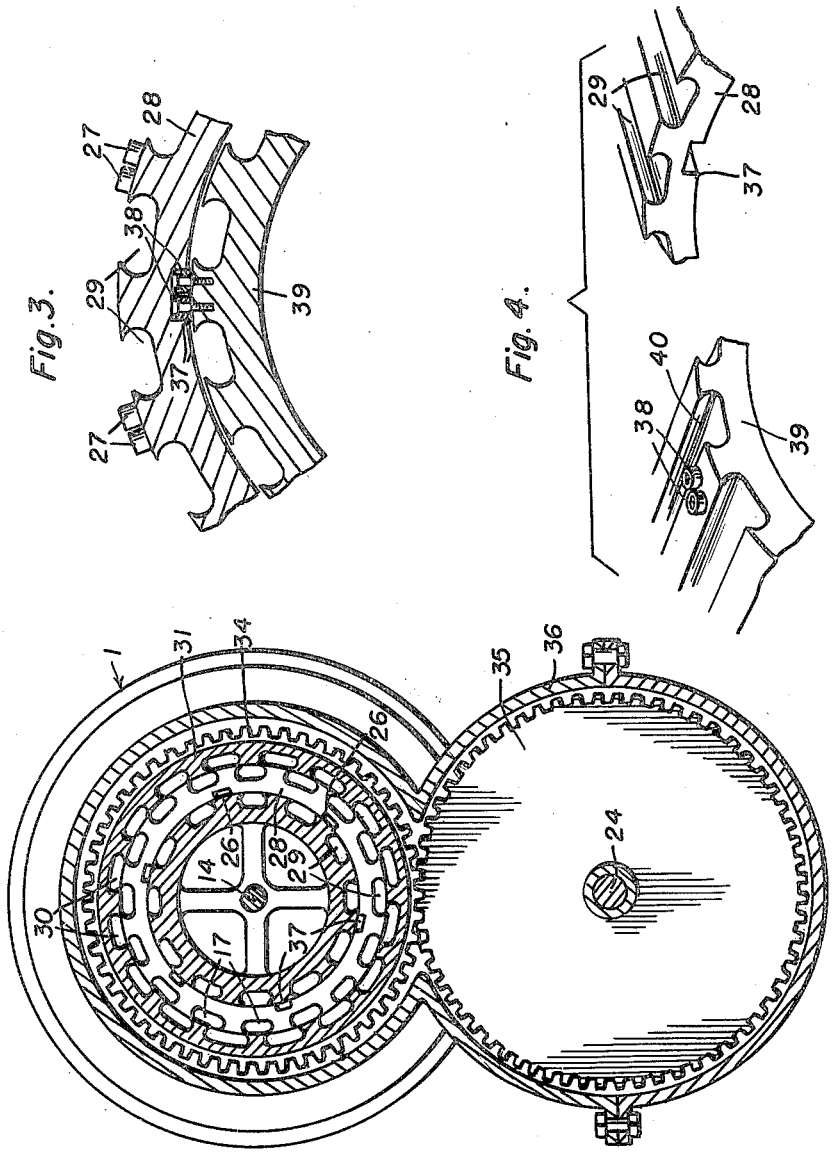

2,495,547

UNITED STATES PATENT OFFICE 2,495,547

FLUID TRANSMISSION

Harry Dale Priest, Culver City, Calif.

Application June 26, 1947, Serial No. 757,271

6 Claims. (Cl. 74—336)

This invention relates to improvements in fluid transmission mechanisms.

An object of the invention is to provide an improved fluid transmission for vehicles or other devices which will include a stepped annular gear casing having a hydraulic jack supported on one end thereof and a cylinder rotatably disposed in the largest portion of said gear casing being driven by the crank shaft of an internal combustion engine, together with a pair of smaller cylinders of different sizes being adapted to telescope and nest within said larger cylinder during the operation of the fluid transmission, and a rotary fluid pump connected with a fluid storage tank and said jack, being driven by gear trains operated by fluid drive from said cylinders and controlled by a valve operable from the dash of the vehicle thus equipped.

Another object of the invention is to provide an improved fluid transmission for vehicles or other types of apparatus which will include a stepped annular gear casing forming three adjacent axially aligned sections of progressively larger size having a hydraulic jack secured to the smaller end of said casing and a rotatable cylinder disposed in the largest section of said casing being driven by the crank shaft of any prime mover, together with an axially arranged guide rod between said cylinder and jack for slidably supporting a pair of smaller cylinders of different sizes for telescoping or nesting within said large cylinder when in driving or power transfer relation, and ball bearing supported gear trains associated with said cylinders for driving a rotary pump connected with a suitable fluid supply tank and said jack, the same being controlled by an inter-connected valve operable from the dash of the vehicle for positively controlling the operation of said fluid transmission.

A further object of the invention is to provide an improved fluid transmission for vehicles including a stepped annular gear casing and laterally disposed annular gear casings connected thereto for respectively supporting a plurality of telescoping cylinders having externally and horizontally grooved driving surfaces and associated driven gears respectively, together with a fluid supply tank and a rotary pump connected therewith and to a hydraulic jack associated with said stepped annular gears, and a control valve for said pump.

A still further object of the invention is to provide an improved fluid transmission which will be highly efficient in operation, and relatively inexpensive to manufacture and produce.

Other objects will appear as the description proceeds.

In the accompanying drawings which form a part of this application,

Figure 1 is a longitudinal sectional view through the improved fluid transmission;

Figure 2 is a transverse sectional view taken on the line 2—2 of Figure 1;

Figure 3 is an enlarged transverse sectional view through portions of the two inner slidably mounted power transfer cylinders;

Figure 4 is an exploded view of portions of the two inner slidably mounted power transfer cylinders, and;

Figure 5 is a partial transverse sectional view through the fluid pump.

Like characters of reference are used throughout the following specification and the accompanying drawings to designate corresponding parts.

In carrying out the invention, there is provided a stepped annular gear casing generally designated by the reference numeral 1 forming three adjacent cylindrical housings 2, 3 and 4 of progressively increasing size. A combined bearing and cover plate 5 is detachably supported upon the end of the largest housing 4 by means of the bolts 6, and is formed with the bearing 7 in the center thereof, through which a driving shaft 8 is rotatably mounted, which shaft may be either the crank shaft of an internal combustion engine (not shown) or any other prime mover, or a shaft connected thereto for being driven thereby.

A bearing 9 is formed in the closed opposite end of the casing 1, and supports a hydraulic jack cylinder 10 thereabout by means of the bolts 11.

A piston 12 is slidably disposed in the jack cylinder 10 and is attached to the inwardly extending piston rod 13 which is slidably mounted through the bearing 9, and whose inner end provides a support for one end of the guide rod 14, whose opposite end is fixed within the closed end 15 of the large cylinder 16 attached to the driving shaft 8.

Longitudinally and horizontally disposed spaced grooves 17 will be formed on the outer surface of the large cylinder 16 to cooperate with the longitudinally and horizontally formed spaced grooves 18 in the inner surface of the annular sleeve 19 disposed about the cylinder 16 and supported for rotation upon the spaced annularly disposed ball bearing races 20 and 21. A ring gear 22 is formed about the sleeve 19 between the ball bearing races 20 and 21 and is constantly in mesh with the small gear wheel 23 fixed to the driven shaft 24 and housed within the gear casing 25 formed on and below the casing 1. Spiral grooves 26 will be formed on the inner surface of the large cylinder 16 for receiving and guiding the bearing rollers 27 supported on the outer surface of the cylinder 28 which is slidably supported upon the guide rod 14.

The cylinder 28 will be formed with spaced longitudinally and horizontally extending grooves 29 in its outer surface for cooperation with the spaced horizontally and longitudinally extending grooves 30 formed in the inner surface of the annular sleeve 31 disposed about the cylinder 28, and rotatably mounted upon the spaced ball bearing races 32 and 33 within the outer section 3 of the casing 1. Likewise, an annular ring gear 34 will be formed on the sleeve 31 between the ball bearing races 32 and 33 for constantly meshing with the intermediate size gear 35 fixed upon the driven shaft 24 and received within the gear casing 36 formed on and below the casing 1. Spiral grooves 37 will be formed on the inner surface of the cylinder 28 for receiving and guiding the bearing rollers 38 supported upon the outer surface of the small cylinder 39 slidably supported upon the guide rod 14 for being telescopically received in the cylinder 28 when the fluid transmission is in operation.

The small cylinder 39 will be formed with spaced longitudinally and horizontally extending grooves 40 in its outer surface for cooperation with the spaced horizontally and longitudinally extending grooves 41 formed in the inner surface of the annular sleeve 42 disposed about the cylinder 39 and rotatably mounted upon the spaced ball bearing races 43 and 44 within the outer section 2 of the casing 1. A ring gear 45 will be formed about the sleve 42 between the ball bearing races 43 and 44 for constantly meshing with the large size gear 46 fixed upon the driven shaft 24 and received within the gear casing 47 formed on and below the casing 1.

A rotary fluid pump casing 48 is secured to the gear casing 47 and is provided with the eccentric rotor 49 keyed to the driven shaft 24 by means of the key 50, said pump casing 48 being connected by the outlet pipe 51 with the outer end of the hydraulic jack cylinder 10, and a resiliently tensioned ball check valve 52 is disposed in said pipe 51 adjacent the pump casing 48.

A pump vane or blade 53 is disposed radially within the housing 54 and is spring projected inwardly by means of the coil spring 55.

The control valve for the fluid transmission comprises a hollow valve casing 56 having a conical lower end 57 whose inner surface forms a seat for the plug valve 58 supported at the lower end of the valve stem 59, and resiliently held down upon the seat by the coil spring 60 disposed thereabout. A flexible connection 61 such as a wire will be connected to the upper end of the valve stem 59 and will extend to the dash of the vehicle (not shown), whereby the valve may be remotely controlled. The bypass pipe 62 is connected between the outlet pipe 51 and the bottom 57 of the valve casing 56, while a fluid supply pipe 63 will be connected to the pump casing 48 and to the pipe 64 connected between the valve casing 56 and a fluid supply tank 65 formed with a filling neck 66.

It will be understood that the space within the stepped casing 1 and the several cylinders 16, 28 and 39 will be completely filled with a suitable fluid such as oil under pressure for lubricating the same, and that the fluid tank 65 will be filled with fluid so that the pump 48 will be able to pump the fluid therefrom into the hydraulic jack when the speed of the pump is sufficiently high.

From the foregoing description, it will be apparent that the mode of operation of the improved fluid transmission will be as follows:

When the vehicle (not shown) is at rest, the cylinder 39 will be within the cylinder 28, and the cylinder 28 will be within the cylinder 16 which will be rotatably mounted within the largest section 4 of the casing 1 so that there will be no fluid coupling between the large cylinder 16 and the large sleeve 19 even while the motor is idling. When the engine or motor is accelerated, the force of the spiral grooves 26 on the bearing rollers 27 will cause the cylinder 28 to move out of the large cylinder 16. The same action takes place with the small cylinder 39 moving out of the cylinder 28 almost instantaneously. While the engine or motor is idling, there will be no action in the pump whatsoever.

As the motor is accelerated, the smallest cylinder 39 moves into sleeve 42 and the first fluid coupling occurs. The sleeve 42 is in mesh with the large cylinder 46 which will naturally turn easier than the gears 35 and 23. Cylinders 28 and 16 which turn the gears 35 and 23 will at first slip until the vehicle gains some momentum, at which time it will begin to set up a fluid coupling between cylinder 28 and the sleeve 31. As this coupling occurs, the drive shaft will rotate at a higher rate of speed and the eccentric rotor will actuate the pump vane correspondingly so that a pressure will be exerted against the piston 12 forcing the piston rod inwardly. The cylinder 39 will thus be pushed inside the cylinder 28. When the coupling is made between the cylinder 16 and sleeve 19, due to further momentum being gained by the vehicle, the eccentric rotor will rotate faster and a greater pressure will be built up behind the piston so that the cylinders 39 and 28 will be pushed inside of cylinder 16.

It is obvious that should the motor be excessively accelerated, the action exerted on the bearing rollers 27 and 38 will be greater, thus requiring greater pressure in the jack 10 to move cylinders 39 and 28 inside of cylinder 16. Therefore, the amount of power desired is controlled by the acceleration of the motor.

When the vehicle reaches high gear or when the cylinders 39 and 28 are inside the cylinder 16, the excess fluid pumped will divert itself back into the storage tank 65 through the valve. By tightening down on the valve, to prevent retrocession of the fluid from the jack cylinder 10 it will be possible to maintain a pressure against the piston and thus control the cylinders to the extent of keeping cylinders 39 and 28 constantly within the cylinder 16. Neither of these conditions is ideal, so it can be seen that the valve can be adjusted to suit any driving conditions and to maintain any desired pressure in the jack 10.

When the motor is decelerated and the vehicle is slowing down, cylinders 39 and 28 will remain inside of cylinder 16 because the jack 10 is filled and the pump will continue to work as long as the vehicle is moving. The motor, however will be dragging on the momentum of the vehicle, or rather revolving slower than the speed of the vehicle. In this case, there will be no force exerted on the bearing rollers 27 and 38 by the spiral grooves 37 and 26. As a result, the cylinders 39 and 28 will remain inside of cylinder 16 until the vehicle stops. If, however, the vehicle is only slowed to a few miles per hour instead of stopping, slight acceleration will cause the vehicle to continue running without any change in the position of the cylinders 39 and 28. Spring 60 will keep the fluid from draining back into the storage tank 65 when the vehicle is running at slow speed or is stopped and the motor is idling or turned off.

From the foregoing description, it will be apparent that there has been devised and provided a highly efficient form of fluid transmission which will be relatively inexpensive to manufacture and produce.

While the preferred embodiment of the invention has been illustrated and described, it will be understood that it is not intended to limit the scope of the invention thereto, as many minor changes in detail of construction may be resorted to without departure from the spirit of the invention.

Having described the invention, what is claimed as new is:

1. A fluid transmission for vehicles comprising a stepped gear casing, a hydraulic jack cylinder mounted at one end of said casing, a drive shaft rotatably disposed at the other end, a main cylinder fixed on said shaft and rotatably disposed in said casing, a piston operatively disposed in said jack cylinder, a piston rod carried by said piston and operatively extending into said casing, a guide rod extending from said piston rod, concentrically disposed cylinders slidably and rotatably disposed on said guide rod and adapted for nesting within said main cylinder, said piston rod being adapted to abut against the cylinders complementary means formed on said cylinders for urging said cylinders from the main cylinder upon rotation thereof by the drive shaft, gear supporting sleeves disposed about each of said cylinders, a fluid coupling between said sleeves and said cylinders, a driven shaft, adjacent gears of progressively larger size disposed on said driven shaft and arranged in constant engagement with the gears on said sleeves, a fluid supply tank, pumping means communicated with said supply tank and operatively connected to the jack cylinder, said pumping means being actuated by said driven shaft for building a progressive pressure in said jack cylinder to move said piston rod against the cylinders and urge the cylinders into nesting engagement with said main cylinder.

2. A fluid transmission for vehicles comprising a stepped gear casing, a hydraulic jack cylinder mounted at one end of said casing, a drive shaft rotatably disposed at the other end, a first cylinder fixed on said shaft and rotatably disposed in said casing, a piston operatively disposed in said jack cylinder, a hollow piston rod carried by said piston and operatively extending into said casing, a guide rod carried by said first cylinder, and disposed in said piston rod a second cylinder and a third cylinder concentrically disposed on said guide rod, said second and third cylinders being rotatably and slidably disposed on said guide rod and adapted for nesting within said first cylinder, said piston rod being adapted to bear at its inner end against the third cylinder said cylinders having complementary spirally arranged means on their adjacent surfaces for urging said second and third cylinders from the first cylinder upon rotation thereof by the drive shaft, adjacent gear supporting sleeves axiallly aligned in said casing, each of said sleeves being operatively disposed about each of the cylinders when the cylinders are extended from their nested engagement, a fluid coupling between each of said cylinders and their respective sleeves, a driven shaft, adjacent gears of progressively larger size disposed on said driven shaft and arranged in constant engagement with the gears on said sleeves, a fluid storage tank, pumping means communicated with said tank and operatively connected to the jack cylinder, said pumping means being actuated by said driven shaft for building a progressive pressure in said jack cylinder to actuate said piston rod and move said second and third cylinders into nesting engagement with said first cylinder, valvular means for selectively maintaining or decreasing the pressure in said jack cylinder and remote control means for said valvular means.

3. The combination of claim 1, wherein said cylinders are provided with spiral grooves in their surfaces and cooperating rollers on adjacent cylinder surfaces operable therein for guiding said cylinders during their movements to nested positions, and a manually operated remotely controlled valve for bypassing the fluid back into the fluid storage tank for rendering the fluid transmission inoperable.

4. The combination of claim 1, wherein said cylinders are provided with spiral grooves in their surfaces and supporting rollers on adjacent cylinder surfaces operable therein for guiding said cylinders during their movement to nested positions, a manually operated remotely controlled valve for bypassing the fluid back into the fluid storage tank for rendering the fluid transmission inoperative, and said gear supporting sleeves and said intermeshed gears being so coupled that slippage will be provided in the transmission until the same operates as a direct fluid drive.

5. The combination of claim 2, wherein said cylinders are provided with spiral grooves in their surfaces and cooperating rollers on adjacent cylinder surfaces operable therein for guiding said cylinders during their movement to a nested position.

6. The combination of claim 2, wherein said pumping means includes a pump casing, an eccentric rotor carried by said driven shaft and disposed in said casing and a resiliently mounted pump vane radially disposed in said casing and actuated by said rotor, said pump casing being interposed in a fluid line between said tank and said hydraulic jack cylinder.

HARRY DALE PRIEST.

REFERENCES CITED

The following references are of record in the file of this patent:

UNITED STATES PATENTS

| Number | Name | Date |
|---|---|---|
| 796,990 | Enrico | Aug. 15, 1905 |
| 876,164 | Ford | Jan. 7, 1908 |
| 1,744,564 | McGill | Jan. 21, 1930 |
| 1,818,910 | Sanine | Aug. 11, 1931 |
| 2,427,432 | Wilhelmy | Sept. 16, 1947 |